Patented Mar. 10, 1936

2,033,339

UNITED STATES PATENT OFFICE 2,033,339

PREPARATION OF ANTHRAQUINONE COMPOUNDS

David X. Klein, Milwaukee, Wis., assignor to E. I. du Pont de Nemours & Company, Wilmington, Del., a corporation of Delaware No Drawing. Application October 22, 1934, Serial No. 749,482

3 Claims. (Cl. 260—58)

This invention relates to improvements in the process for preparing thio-ethers of the anthraquinone series.

In the preparation of alpha-thio-ethers of anthraquinone from the corresponding anthraquinone sulfonic acids, according to the prior art, the organic mercaptan is reacted with the anthraquinone sulfonic acid in an aqueous medium and in the presence of an alkali at atmospheric pressure under reflux, or lower temperatures. When the di-alkyl or aryl-thio-ethers are prepared by this method the yields are low and the product contains a large percentage of the mono-thio-ether. Large excesses of the mercaptan are also required.

It is therefore an object of this invention to provide an improved process for the preparation of di-alkyl and/or aryl-thio-ethers of anthraquinone from the corresponding anthraquinone sulfonic acids, whereby the yields of dithio-ether may be materially increased, and whereby a more pure dithio-ether can be obtained. It is a further object to provide a process for preparing thio-ethers of the anthraquinone series wherein only a small excess of mercaptan need be used to produce maximum yields.

These objects are accomplished according to my invention by carrying out the reaction between the anthraquinone sulfonic acids and the alkyl or aryl mercaptan in the presence of an alkali at temperatures of from about 130 to 160° C.

Mixed dithio-ethers may also be prepared by this method in good yields by first forming the mono-alkyl or aryl-thio-ether of the anthraquinone disulfonic acid, and then further reacting the mono-thio-ether-monosulfo acid with another aryl or alkyl mercaptan at elevated temperatures and pressures.

The following examples are given to more fully illustrate my invention.

Example 1

20.5 gms. of anthraquinone-1, 8-disodium sulfonate are placed in an autoclave of 1 qt. capacity with 6 gms. solid caustic soda, 22 gms. lauryl mercaptan, and 500 c. c. water. The autoclave is sealed and heated to 150° C. where it is held for 12 hours (a pressure of about 30 pounds per square inch being thus obtained). It is then cooled and discharged. The product, which is filtered, washed and dried at low temperatures, is anthraquinone-1,8-dilauryl thioether. It is a red solid of low melting point soluble in the ordinary organic solvents.

Example 2

41.2 gms. 100% anthraquinone-1.8-disodium sulfonate are treated with 12 gms. solid caustic soda, 14 gms. ethyl mercaptan, and 600 c. c. water in a 1 qt. autoclave at 150° C. for 6 hours. It is then cooled and filtered. The washed and dried product is dissolved in 200 c. c. chlorobenzol at the boil, filtered from insoluble impurities, and the chlorobenzol steamed off.

There is obtained 27.5 gms. of bright orange anthraquinone-1,8-diethyl thiol in a yield of approximately 84% theory.

Example 3

412 gms. anthraquinone-1,5-disodium sulfonate are dissolved in 3200 c. c. water contained in an autoclave of 3 gallon capacity. To this is added 120 gms. flaked sodium hydroxide and 198 gms. n-butyl mercaptan. The autoclave is sealed and heated to 150° in 3 hours and held at 150° for 12 hours, this giving a pressure of approximately 30 pounds per square inch. It is then cooled and the product, which separates in the form of long yellow needles, is filtered off. It consists of anthraquinone-1,5-di-n-butyl thiol obtained in a yield of 95% theory based on anthraquinone-1,5-disodium sulfonate.

Example 4

412 gms. of a mixture of anthraquinone-1,5- and 1,8-disodium sulfonates, such as is obtained by drowning an alpha sulfonation of anthraquinone in concentrated sodium sulfate, are added to 6400 c. c. water contained in a 3 gallon autoclave. 120 gms. solid flaked caustic soda and 198 gms. n-butyl mercaptan are also added and the vessel is sealed and heated to 150° C. in three hours, and held for 12 hours, whereupon it is cooled to room temperature. The contents are removed to a 12 liter balloon flask, and 4000 c. c. monochlorobenzol are added to it. The mixture is heated to 95° C. with vigorous agitation until complete solution results. It is then filtered quickly and the chlorobenzol is steamed out. The product remains suspended in the alkaline solution as bright orange crystals. It contains no components insoluble in the ordinary organic solvents, the impurities, mercury, etc., from the sulfonation and condensation having been removed by the chlorobenzol extraction and filtration.

The yield, based on the mixed anthraquinone sulfonic acids, is about 90% of theory of mixed anthraquinone-1,5 and 1,8-di-n-butyl-thio ether.

Example 5

77.5 gms. anthraquinone-1-sodium sulfonate, 25 gms. n-butyl-mercaptan, 15 gms. caustic soda and 500 c.c. water are heated at 150° C. for 6 hours in a 1 qt. autoclave. After treating as in Example 4, a yield of approximately 90% anthraquinone-1-n-butyl thiol is obtained.

Example 6

39.8 gms. anthraquinone-1-butyl-thiol-5-sodium-sulfonate, 14 gms. p-tolyl mercaptan, 4.5 gms. flake caustic and 600 c.c. water are heated together at 150° C. for 6 hours. The water-insoluble orange body isolated is 1-butyl-5-p-tolyl-anthraquinone-dithiol. The anthraquinon 1-butyl-thiol-5-sodium sulfonate may be prepared by ordinary means from anthraquinone-1,5-disodium sulfonate by refluxing with mercaptan and caustic.

Example 7

20.6 gms. anthraquinone-1,5-disodium sulfonate, 13.64 gms. p-tolyl-mercaptan, 6 gms. caustic and 500 c.c. water are heated to 150° C. for 12 hours. When cooled and filtered, anthraquinone-1,5-di-p-tolyl-thiol is isolated in good yield.

The time of reaction and temperatures given in the above examples illustrate the preferred range; however, a lower temperature and increased time are also operable. Below 130° the yield is decreased unless the time of the reaction is unduly prolonged. Temperatures over 160° C. tend to produce products of poor quality due to decomposition.

Mixed alkyl or mixed aryl-dithio-ethers may be prepared by this method in the same manner as the mixed alkyl-aryl dithio-ether in Example 6. In preparing the mixed ethers as in Example 6, the aryl mercaptan may be reacted first, followed by the condensation with the alkyl mercaptan at the higher temperatures.

Other alkyl- or aryl-mercaptans than those mentioned in the specific examples may of course be used.

I claim:

1. In the preparation of anthraquinone-thio-ethers wherein an anthraquinone sulfonic acid is reacted with a mercaptan in the presence of an alkali in aqueous solution, the step which comprises carrying out the reaction at elevated pressures at a temperature of 130 to 160° C.

2. The process which comprises reacting an anthraquinone-alpha-disulfonic acid with a mercaptan in the presence of an alkali in aqueous solution at a temperature of 130 to 160° C. and at elevated pressure.

3. In the preparation of anthraquinone-alpha, alpha-dithio-ethers wherein a mercaptan is reacted with an anthraquinone-alpha, alpha-disulfonic acid, the step which comprises replacing the second sulfonic acid group of the anthraquinone compound by a mercaptan radical by carrying out the reaction at temperatures of 130 to 160° C. and at elevated pressures.

DAVID X. KLEIN.